(12) United States Patent
Falzon et al.

(10) Patent No.: US 7,327,893 B2
(45) Date of Patent: Feb. 5, 2008

(54) METHOD FOR COMPRESSING DIGITAL IMAGES

(75) Inventors: Frédéric Falzon, Pegomas (FR); Christophe Bernard, Paris (FR)

(73) Assignee: Alcatel, Paris (FR)

( * ) Notice: Subject to any disclaimer, the term of this patent is extended or adjusted under 35 U.S.C. 154(b) by 748 days.

(21) Appl. No.: 10/428,845

(22) Filed: May 5, 2003

(65) Prior Publication Data

US 2003/0210824 A1    Nov. 13, 2003

(30) Foreign Application Priority Data

May 7, 2002    (FR)    ................................. 02 05724

(51) Int. Cl.
*G06K 9/36*    (2006.01)
(52) U.S. Cl. ...................... 382/240; 382/232
(58) Field of Classification Search ................ 382/232, 382/233, 240, 218; 375/240.11, 240.18, 375/240.19, 240.26
See application file for complete search history.

(56) References Cited

U.S. PATENT DOCUMENTS 6,359,928 B1 * 3/2002 Wang et al. ............ 375/240.05
7,046,851 B2 * 5/2006 Keaton et al. ............... 382/232

FOREIGN PATENT DOCUMENTS

WO    WO 9917257    4/1999

OTHER PUBLICATIONS

V. Nuri, "Space-frequency adaptive subband image coding", IEEE Transactions on Circuits and Systems II: Analog and Digital Signal Processing, Aug. 1998, IEEE, USA, vol. 45, No. 8, pp. 1168-1173, XP001122120.

M. S. Lewicki et al, "Learning Overcomplete Representations", Neural Computation, Massachusetts, Institute of Technology, US, vol. 12, Feb. 2000, pp. 337-365, XP008007344.

C. Chrysafis et al, Context-based adaptive image coding, Signals, Systems and Computers, 1996, Conference Record of the Thirtieth Asilomar Conference on Pacific Grove, CA, USA, Nov. 3-6, 1996, Los Alamitos, CA, USA IEEE Comput. Soc, US—Nov. 3, 1996, pp. 1274-1278, XP010231352.

(Continued)

*Primary Examiner*—Duy M. Dang
(74) *Attorney, Agent, or Firm*—Sughrue Mion, PLLC

(57) ABSTRACT

The invention concerns a method for compressing data, in particular images, by transform, in which method this data is projected onto a base of localized orthogonal or biorthogonal functions, such as wavelets. To quantize each of the localized functions with a quantization step that enables an overall set rate $R_c$ to be satisfied, the method includes the following steps:

a probability density model of coefficients in the form of a generalized Gaussian is associated with each subband, the parameters $\alpha$ and $\beta$ of this density model are estimated, while minimizing the relative entropy, or Kullback-Leibler distance, between this model and the empirical distribution of coefficients of each subband, and from this model, for each subband, an optimum quantization step is determined such that the rate allocated is distributed in the various subbands and such that the total distortion is minimal. As a preference, for each subband, the graphs of rate R and distortion D are deduced, from the parameters $\alpha$ and $\beta$, as a function of the quantization step and these graphs are tabulated to determine said optimum quantization step.

11 Claims, 1 Drawing Sheet

OTHER PUBLICATIONS

E. P. Simoncelli et al, "Embedded Wavelet Image Compression Based on a Joint Probability Model", Proceedings of the International Conference on Image Processing. ICIP 1997, Santa Barbara, CA Oct. 26-29, 1997, Los Alamitos, CA, IEEE, US, vol. 1 Oct. 26, 1997 pp. 674-643, XP000792853.

Y. Wang et al, "Modeling of Wavelet Coefficients in Medical Image Compression", Proceedings of the International Conference on Image Processing ICIP 1997, Santa Barbara, CA Oct. 26-29, 19987, Los Alamitos, CA, IEEE, US, vol. 1, Oct. 26, 1997, pp. 644-647, XP000792854.

* cited by examiner

METHOD FOR COMPRESSING DIGITAL IMAGES

CROSS-REFERENCE TO RELATED APPLICATIONS

This application is based on French Patent Application No. 02 05 724 filed May 7, 2002, the disclosure of which is hereby incorporated by reference thereto in its entirety, and the priority of which is hereby claimed under 35 U.S.C. §119.

BACKGROUND OF THE INVENTION

1. Field of the Invention

The invention relates to a method for optimal allocation of the bit rate of a data compressor by transform.

It concerns more specifically such an allocation process for a compressor by orthogonal or biorthogonal transformation, in particular a wavelet transformation, used in combination with a scalar quantizer and a lossless entropy coder.

Hereinafter, reference will mainly be made to a wavelet transformation leading to a Multiresolution Analysis (MRA) implemented using digital filters intended to perform a decomposition into subbands. However, the invention is not limited to a wavelet transformation.

It is recalled that an MRA consists in starting from an image in the space domain with a set of image elements, or pixels, and in decomposing this image into subbands in which the vertical, horizontal and diagonal details are represented. Thus there are three subbands per resolution level as indicated in FIG. 1.

FIG. 1 illustrates an MRA on three resolution levels. In this representation, a subband is represented by a block. Thus, the image is first divided into four blocks with three subbands $W_{1,1}$, $W_{1,2}$ and $W_{1,3}$ and a low-frequency representation $W_{1,0}$ of the initial image. Subband $W_{1,1}$ contains the horizontal wavelet coefficients; subband $W_{1,2}$ contains the vertical wavelet coefficients; subband $W_{1,3}$ contains the diagonal wavelet coefficients and the block $W_{1,0}$ is called "summary" or low frequencies.

At the next resolution level, the block $W_{1,0}$ is itself divided into four blocks (one summary and three subbands) $W_{2,0}$, $W_{2,1}$, $W_{2,2}$ and $W_{2,3}$ and, finally, the block $W_{2,0}$ is divided into four blocks $W_{3,0}$, $W_{3,1}$, $W_{3,2}$ and $W_{3,3}$ for the third resolution level. Naturally, a finer division (by increasing the resolution levels) or a coarser division (by reducing the number of resolution levels) can be carried out.

2. Description of the Prior Art

It is known that the wavelet transform is well suited to image compression since it provides strong coefficients when the image exhibits strong local variations in contrast, and weak coefficients in the areas in which the contrast varies slightly or slowly.

It is also known that the probability distribution of a subband can be modeled by a two-parameter unimodal function, centered at the origin, of the generalized Gaussian type:

$$G_{\alpha\beta}(x) = \frac{\beta}{2\alpha\Gamma\left(\frac{1}{\beta}\right)} e^{-\left|\frac{x}{\alpha}\right|^\beta}$$

where $$\Gamma(\xi) = \int_0^{+\infty} e^{-x} x^{\xi-1} dx$$

For certain applications, particularly when the compression data must be transmitted over transmission channels imposing a bit rate, it is necessary to quantize the subband coefficients in an optimal manner by minimizing the total distortion while satisfying a set bit rate.

The known optimum rate allocation methods propose, in general, performing a digital optimization process based on the minimization of a functional linking rate and distortion and controlled by a Lagrange parameter. In this case, an iterative optimization algorithm is employed which is generally very costly in calculation time and therefore cannot be used for real-time applications or for applications with limited calculation resources. Only simplification of these methods enables higher speed, but the price is a degradation in performance.

SUMMARY OF THE INVENTION

The invention enables an effective and precise optimization of rate allocation, without making use of a conventional Lagrangian optimization scheme.

To implement an optimum rate allocation, the method in accordance with the invention includes the following steps:
  a) the image (or data) to be compressed is projected onto a base of localized orthogonal or biorthogonal functions, such as wavelets,
  b) a set rate $R_c$ is chosen, representing the total number of bits that can be used to code all coefficients of the transformed image,
  c) to allocate this number of bits to the coefficients which are going to be quantized:
      c.1 a probability density model in the form of a generalized Gaussian is associated with each of the subbands,
      c.2 the parameters of this generalized Gaussian are estimated while minimizing the relative entropy, or Kullback-Leibler distance, between this generalized Gaussian and the empirical distribution of coefficients of each subband, and an optimum quantization step is then deduced therefrom, which is such that the total allocated rate $R_c$ is distributed in the various subbands while minimizing the total distortion.

Generalized Gaussians are described in the article by S. MALLAT: "Theory for multiresolution signal decomposition: the wavelet representation", published in IEEE Transaction on pattern analysis and machine intelligence, vol. 11 (1989) No. 7, pages 674-693.

As a preference, to determine the optimum quantization step for each subband, from the parameters of the generalized Gaussian, the graph of rate as a function of the quantization step and the graph of distortion as a function of the quantization step are determined, and the graphs of rate and distortion are tabulated and, from these tabulated graphs, the optimum quantization step is deduced. Minimization of the Kullback-Leibler distance for estimating the parameters of the generalized Gaussian model ensures a minimization of the cost of coding in accordance with information theory.

Thus, the invention concerns a method for compressing data, in particular images, in which method this data is projected onto a base of localized orthogonal or biorthogonal functions, and which method, to quantize each of the localized functions with a quantization step that enables an overall set rate $R_c$ to be satisfied, includes the following steps:

a) a probability density model of coefficients in the form of a generalized Gaussian is associated with each subband, b) the parameters $\alpha$ and $\beta$ of this density model are estimated while minimizing the relative entropy, or Kullback-Leibler distance, between this model and the empirical distribution of coefficients of each subband, and c) from this model, for each subband, an optimum quantization step is determined such that the rate allocated is distributed in the various subbands and such that the total distortion is minimal.

As a preference, for each subband, the graphs of rate R and distortion D are deduced, from the parameters $\alpha$ and $\beta$, as a function of the quantization step and these graphs are tabulated to determine said optimum quantization step.

The transformation is, for example, of the wavelet type.

In this case, according to an embodiment, to determine the parameter $\beta$ of the generalized Gaussian associated with each subband, the following expression is minimized:

$$H(p_1 \| G_{\alpha(\beta),\beta}) = \frac{1}{\beta} + \frac{1}{\beta}\log(\beta W_{jk}^\beta) + \log\left(\frac{2\Gamma(1/\beta)}{\beta}\right),$$

in which formula the first term represents said relative entropy, $$W_{jk}^\beta$$

has the value:

$$W_{jk}^\beta = \frac{1}{n_{jk}} \sum_{n,m} |W_{jk}[n,m]|^\beta$$

$W_{jk}[n,m]$ being a coefficient of a subband, and $n_{jk}$ being the number of coefficients in the subband of index j,k.

As a preference, the parameter $\alpha$ of the generalized Gaussian for the corresponding subband j,k is determined by the following formula:

$$\alpha = \sqrt[\beta]{\beta W_{jk}^\beta}$$

The tabulation of the distortion values is advantageously carried out for a sequence of values of the parameter $\beta$.

Similarly, the tabulation of the rates R is advantageously carried out for a sequence of values of the parameter $\beta$.

The sequence of values of the parameters $\beta$ is for example:

$$\left\{\frac{1}{2}, \frac{1}{\sqrt{2}}, 1, \sqrt{2}, 2\right\}$$

As a preference, the bit budget is distributed to each of the subbands according to their ability to reduce the distortion of the compressed image.

In one embodiment, a bit budget corresponding to the highest tabulated quantization step is assigned to each subband and the remaining bit budget is then cut into individual parts that are gradually allocated to the localized functions having the greatest ability to make the total distortion decrease, this operation being repeated until the bit budget is exhausted.

According to one embodiment, the localized functions and the quantization step for each subband and the parameters of the density model are coded using a lossless entropy coder.

Other features and advantages of the invention will become apparent with the description of some of its embodiments, this description being provided with reference to the accompanying drawings.

DETAILED DESCRIPTION OF THE PREFERRED EMBODIMENTS

The example of the invention that will be described below concerns an allocation of rate by subbands. It is carried out in three steps:

First Step: Wavelet Transformation of the Image

Figure 1:
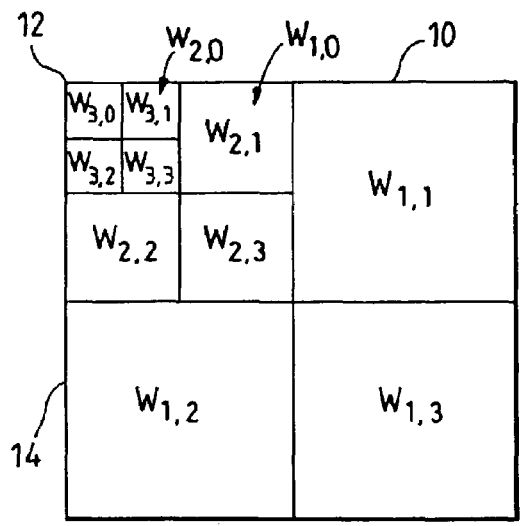
FIG. 1, already described, shows the decomposition into subbands of an image on three resolution levels.

This transformation provides a family of wavelet coefficients $W_{jk}[n,m]$ distributed in various subbands, where j denotes the scale of the subband and k its orientation (FIG. 1). The number of indexes n,m for which wavelet coefficients are thus defined depends on the scale of the subband. It is therefore noted $n_{jk}$.

Consider, for example, an image of size 512×512 pixels of a terrestrial landscape obtained by an observation satellite. The size of a subband j,k is in this case $n_{jk}=(512/2^j)^2$.

Second Step: A total rate setting is allocated for all the subbands and this total rate setting is distributed among the various subbands.

To assign the rate in each subband, the procedure is as follows:

a) It is considered that the coefficients in each subband j,k are distributed according to a statistical distribution corresponding to a generalized Gaussian of parameters $\alpha$ and $\beta$. These parameters $\alpha$ and $\beta$ are estimated, in a manner that will be described later, while minimizing the Kullback-Leibler distance between this statistical model and the empirical distribution of coefficients of each subband.

b) The knowledge of these parameters α and β can be used to predict, for each subband j,k, the distortion $D_{jk}$ which will be associated with a rate $R_{jk}$ which will be allocated to it, and the relationship between these two parameters α and β and the quantization step $\Delta_{jk}$ chosen for this subband. Rate scheduling is carried out by distributing the rate setting R among the subbands j,k, in such a way that the complete rate is allocated to them:

$$R = \sum_{jk} R_{jk}$$

and that the resulting distortion $$D = \sum_{jk} D_{jk}$$

is minimal.

At the end of the scheduling phase, an optimum quantization step $\Delta_{jk}$ has therefore been determined for each subband, enabling the rate setting R to be reached while minimizing the total distortion D.

Third step: The subbands are quantized with quantization steps $\Delta_{jk}$ which can be different from one subband to another and the quantized coefficients are sent to an entropy coder.

Determination of Parameters α and β of the Generalized Gaussians for each Subband:

For each subband j,k, the statistical distribution of the subband tends toward a generalized Gaussian $G_{\alpha\beta}$:

$$G_{\alpha\beta}(x) = A_{\alpha\beta} e^{-\left|\frac{x}{\alpha}\right|^\beta}$$

where $$A_{\alpha\beta} = \frac{\beta}{2\alpha\Gamma(1/\beta)}$$

To determine the parameters α and β, as indicated above, the relative entropy between this subband density model and the empirical density of this subband is minimized.

It is recalled here that the relative entropy, or Kullback-Leibler distance, between two probability densities $p_1$ and $p_2$ is given by:

$$D(p_1 \| p_2) = \int p_1(x) \log \frac{p_1(x)}{p_2(x)} dx.$$

In the sense of this Kullback-Leibler distance, the distribution $p_2$ which best tends toward the distribution $p_1$ is that which minimizes $D(p_1\|p_2)$.

Note furthermore that to determine $p_2$ which minimizes $D(p_1\|p_2)$, for a fixed $p_1$, the following is minimized:

$$D(p_1\|p_2) = \int p_1(x)\log p_1(x)dx - \int p_1(x)\log p_2(x)dx.$$

As the first term of this difference does not depend on $p_2$, minimizing this sum in $p_2$ amounts to minimizing the second term of this sum, and therefore amounts to minimizing:

$$H(p_1\|p_2) = -\int p_1(x)\log p_2(x)dx \qquad (1)$$

If $p_1$ and $p_2$ are discrete distributions, the term above is then the average rate of coding of a source of symbols of probability distribution $p_1$, coded with optimum entropy symbols for a distribution $p_2$.

Minimizing this term amounts therefore to choosing a model distribution $p_2$ which will produce the most efficient symbols for coding a distribution source $p_1$.

Therefore $D(p_1\|p_2)$ will be minimized and not the reverse, $D(p_2\|p_1)$, since the Kullback-Leibler distance is not symmetric.

In the present case, the distribution $p_1$ is the empirical distribution of a subband (j,k):

$$p_1(x) = \frac{1}{n_{jk}} \sum_{n,m} \delta(x - W_{jk}[n,m]) \qquad (2)$$

and the distribution $p_2$ is the generalized Gaussian indicated above:

$$p_2(x) = G_{\alpha\beta}(x) = A_{\alpha\beta} e^{-\left|\frac{x}{\alpha}\right|^\beta} \qquad (3)$$

The expression (1) calculated with (2) and (3) gives:

$$H(p_1 \| G_{\alpha\beta}) = -\frac{1}{n_{jk}} \sum_{n,m} \log\left(A_{\alpha\beta} e^{-\left|\frac{W_{jk}[n,m]}{\alpha}\right|^\beta}\right)$$

$$= -\log A_{\alpha\beta} + \frac{1}{n_{jk}} \sum_{n,m} \left|\frac{W_{jk}[n,m]}{\alpha}\right|^\beta$$

Using the value of $A_{\alpha\beta}$ gives:

$$H(p_1 \| G_{\alpha\beta}) = -\log\beta + \log 2 + \log\alpha + \log\Gamma(1/\beta) + \frac{1}{n_{jk}} \sum_{n,m} \left|\frac{W_{jk}[n,m]}{\alpha}\right|^\beta \qquad (4)$$

Minimization in $\alpha,\beta$ is carried out in two steps: during the first step, $\alpha$ is minimized for a fixed $\beta$; this minimization is performed by a simple explicit calculation. During the second step, a search is carried out for an optimum $\beta$ using tabulated values to avoid calculations that are too complex.

Minimization of $\alpha$ for a Fixed $\beta$

To minimize expression (4) in $\alpha$, with a fixed $\beta$, the sum of the terms that depend on $\alpha$ must be minimized, other terms being constants, that is:

$$\log\alpha + \frac{1}{n_{jk}}\sum_{n,m}\left|\frac{W_{jk}[n,m]}{\alpha}\right|^{\beta}$$

The derivative of this expression with respect to $\alpha$ is:

$$\frac{1}{\alpha} - \frac{\beta}{\alpha^{\beta+1}n_{jk}}\sum_{n,m}\left|\frac{W_{jk}[n,m]}{\alpha}\right|^{\beta}$$

and its derivative is cancelled for $$\alpha = \sqrt[\beta]{\frac{\beta}{n_{jk}}\sum_{n,m}|W_{jk}[n,m]|^{\beta}}$$

To lighten the notations, the moment of order $\beta$ of the subband $j,k$ is defined:

$$W_{jk}^{\beta} = \frac{1}{n_{jk}}\sum_{n,m}|W_{jk}[n,m]|^{\beta}$$

which is therefore the average of the absolute values of coefficients of the subband, raised to the power $\beta$.

The optimum $\alpha$ is then written simply:

$$\alpha = \sqrt[\beta]{\beta W_{jk}^{\beta}} \qquad (5)$$

Calculation of Optimum $\beta$

It is therefore known how to determine the optimum $\alpha$ once $\beta$ is known. To determine the optimum $\beta$, in equation (4) $\alpha$ is replaced by the value given by equation (5). The following is obtained:

$$H(p_1 \| G_{\alpha\beta}) = -\log\beta + \log 2 + \frac{1}{\beta}\log(\beta W_{jk}^{\beta}) + \log\Gamma(1/\beta) + \frac{1}{n_{jk}}\sum_{n,m}\left|\frac{W_{jk}[n,m]}{\sqrt[\beta]{\beta W_{jk}^{\beta}}}\right|^{\beta}$$

$$= -\log\beta + \log 2 + \frac{1}{\beta}\log(\beta W_{jk}^{\beta}) + \log\Gamma(1/\beta) + \frac{W_{jk}^{\beta}}{\beta W_{jk}^{\beta}}$$

$$= -\log\beta + \log 2 + \frac{1}{\beta}\log(\beta W_{jk}^{\beta}) + \log\Gamma(1/\beta) + \frac{1}{\beta}$$

The optimum value of $\beta$ will therefore be obtained by minimizing the expression above which can again be rewritten in the following form:

$$H(p_1 \| G_{\alpha(\beta),\beta}) = \frac{1}{\beta} + \frac{1}{\beta}\log(\beta W_{jk}^{\beta}) + \log\left(\frac{2\Gamma(1/\beta)}{\beta}\right) \qquad (6)$$

Thus, the calculation of the optimum $\alpha,\beta$ pair is carried out in two stages:

First, $\beta$ is calculated by minimizing expression (6).

Secondly, $\alpha$ is calculated using expression (5).

$\beta$ is chosen from a finite number of candidate values, for example $$\left\{\frac{1}{2}, \frac{1}{\sqrt{2}}, 1, \sqrt{2}, 2\right\}$$

and most of the calculations can be tabulated. The only component which actually depends on the subband is $$\frac{1}{\beta}\log(\beta W_{jk}^{\beta}).$$

The calculation of $\alpha$ is hence explicit.

To avoid any confusion, it is stated here that, strictly, these coefficients should be called $\alpha_{jk}$ and $\beta_{jk}$ since they are, a priori, different for each subband.

In the example above, for the subband $W_{1,1}$ the calculation of $W_{1,1}^{\beta}$ and of the expression (6) for values of $\beta$ in the set $$\left\{\frac{1}{2}, \frac{1}{\sqrt{2}}, 1, \sqrt{2}, 2\right\}$$

gives the values set out in table 1 below:

TABLE 1

Values of $W_{1,1}^{\beta}$ and $H(p_1 \| G_{\alpha(\beta),\beta})$ for the candidate values of $\beta$.

| $\beta$ | 1/2 | $1/\sqrt{2}$ | 1 | $\sqrt{2}$ | 2 |
|---|---|---|---|---|---|
| $W_{1,1}^{\beta}$ | 1.42 | 1.88 | 3.17 | 7.96 | 38.6 |
| $H(p_1 \| G_{\alpha(\beta),\beta})$ | 2.70 | 2.74 | 2.85 | 3.02 | 3.25 |

The minimum is therefore reached for $\beta=\frac{1}{2}$. The corresponding value of $\alpha$ is then $$\alpha = \left(\frac{W_{1,1}^{1/2}}{2}\right)^2 = 0.502$$

The following is therefore obtained: $\alpha_{1,1}=0.502$ and $\beta_{1,1}=\frac{1}{2}$.

The parameters $\alpha$ and $\beta$ for the other subbands are calculated in the same way.

After having determined $\alpha$ and $\beta$, the relationship between rate R and quantization step $\Delta$ and between the distortion D and the quantization step are determined. The graphs $R(\Delta)$ and $D(\Delta)$ are tabulated and used in such a way that, for each subband, an optimum quantization step is obtained, that is, in such a way that the allocated rate R is distributed in the various subbands and that the total distortion is minimal.

Prediction of the Relationship between Rate and Quantization Step

If a subband has a statistical distribution described by a generalized Gaussian $G_{\alpha,\beta}$, the associated rate (in bits per coefficient) is noted $r(\alpha,\beta,\Delta)$, for a quantization step $\Delta$.

This rate is the entropy of the quantized subband with a quantization step $\Delta$, which is, for example in the case of a uniform quantization:

$$r(\alpha, \beta, \Delta) = -\sum_{k=-\infty}^{+\infty} p_k(\alpha, \beta, \Delta)\log_2 p_k(\alpha, \beta, \Delta)$$

if $$p_k(\alpha, \beta, \Delta) = \int_{(k-1/2)\Delta}^{(k+1/2)\Delta} G_{\alpha,\beta}(x)\,dx$$

The rate allocation means must know the relationship between r and $(\alpha,\beta,\Delta)$. For this purpose, it is sufficient to tabulate the function r. Since it can be verified that:

$$r(\alpha, \beta, \Delta) = r\left(1, \beta, \frac{\Delta}{\alpha}\right)$$

it is sufficient to tabulate the functions $x \mapsto r(1,\beta,x)$ for all the candidate values of $\beta$ (there are five in the above example). The x values are also considered in a range $[x_{min}, x_{max}]$.

Note that the same type of calculations and tabulations can be performed if a quantizer is used, having a quantization interval, centered at 0, of different size, as is often the case in the coding of images by wavelets.

For a subband of size $n_{jk}$, the total rate will then be $$R_{jk}=n_{jk}r(\alpha,\beta,\Delta).$$

Figure 2:
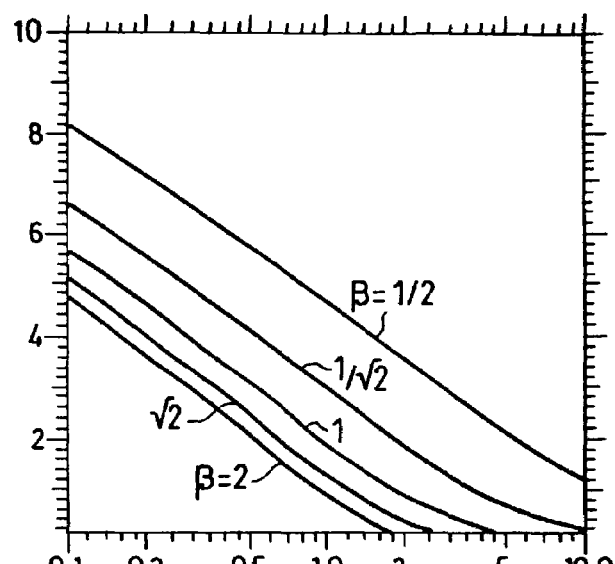
FIG. 2 is a diagram showing graphs of rate for an example application of the method according to the invention.

FIG. 2 indicates tabulated values of $r(1,\beta,x)$, for values of $\beta$ in $$\left\{\frac{1}{2}, \frac{1}{\sqrt{2}}, 1, \sqrt{2}, 2\right\}.$$

In FIG. 2, the values of x are plotted as abscissae and the values r of rate are plotted as ordinates.

Relationship between Distortion and Quantization Step

In the same way, the relationship between quantization step and distortion can be modeled in a subband having a statistical distribution tending toward a generalized Gaussian. The average distortion per coefficient is noted $D(\alpha,\beta,\Delta)$, for a subband of generalized Gaussian statistical distribution $G_{\alpha\beta}$.

This distortion is written:

$$d(\alpha, \beta, \Delta) = \int_{-\infty}^{+\infty} G_{\alpha\beta}(x)\left(x - \Delta\left[\frac{x}{\Delta}\right]\right)^2 dx$$

where [x] denotes the integer that is closest to x, for the case in which the quantization operator is a uniform quantization.

Here also, the values of $d(\alpha,\beta,\Delta)$ can be tabulated economically, by making use of the following homogeneity equation:

$$d(\alpha,\beta,\Delta)=\alpha^2 d(1,\beta,\Delta/\alpha)$$

and it will therefore be sufficient to tabulate the function $$x \mapsto d(1,\beta,x)$$

for values of $\beta$ in the range of chosen candidate values, and values of x selected in $[x_{min}, x_{max}]$.

Here again, the total distortion for a subband is the sum of distortions per coefficients, and it is therefore written:

$$D_{jk}=n_{jk}d(\alpha,\beta,\Delta)$$

Figure 3:
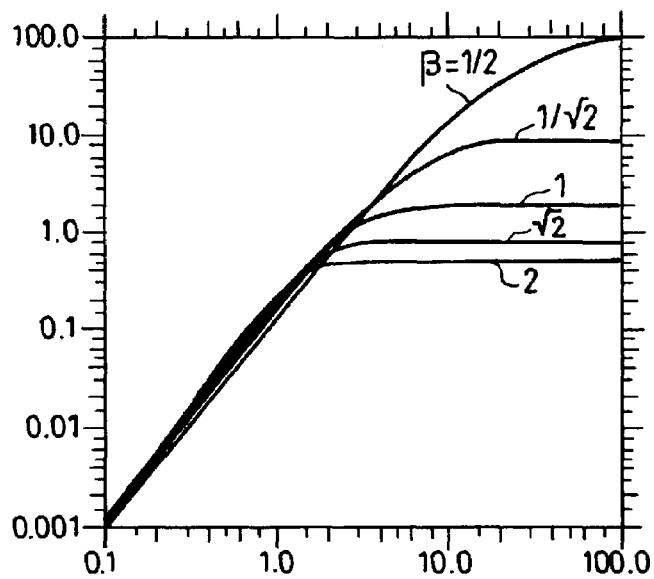
FIG. 3 is a diagram similar to that of FIG. 2 for graphs of distortion.

The tabulated graphs are shown in FIG. 3.

In said FIG. 3, the x values are plotted as abscissa and the distortion as ordinate.

For a fixed $\alpha$ and $\beta$, the relationship between r and $\Delta$ is invertible. This inversion is performed either by tabulation in advance, or by interpolation of the tabulated values of $r(1,\beta,x)$. Similarly, the relationship between d and $\Delta$ can be inverted.

The function which associates a quantization step $\Delta$ with a distortion d is noted $d^{-1}$ and the function which associates the quantization step $\Delta$ with a rate r is noted $r^{-1}$, for fixed $\alpha$ and $\beta$:

$$\Delta=d^{-1}(\alpha,\beta,d)$$

$$\Delta=r^{-1}(\alpha,\beta,r)$$

The rate scheduling consists in cutting the set rate R into fragments which will be promptly allocated. This assignment is carried out iteratively.

For the initialization, the starting point, for each subband, is a maximum quantization step specified by the tables of $R(\alpha,\beta,\Delta)$ and $D(\alpha,\beta,\Delta)$, which will be:

$$\Delta_{jk} \frac{x_{\max}}{\alpha_{jk}}.$$

Rates $R_{jk}$ and distortions $D_{jk}$ are associated with these quantization steps by the formulae:

$$R_{jk} = n_{jk} r(\alpha_{jk}, \beta_{jk}, \Delta_{jk})$$

$$D_{jk} = n_{jk} d(\alpha_{jk}, \beta_{jk}, \Delta_{jk})$$

The rate remaining to be allocated is therefore $$R - \sum_{jk} R_{jk}.$$

This rate is cut into N fragments $F_n$ which can be of the same size or of different sizes, with $$F_1 + \ldots + F_N = R - \sum_{jk} R_{jk}.$$

Above all, the maximum size of a fragment must remain small in view of the total rate setting. Each of these fragments is then allocated iteratively, as follows:

For each subband, the potential rate is calculated which would be the rate associated with the subband if this new rate fragment $F_n$ happened to be allocated to it:

$$R_{jk}^* = R_{jk} + F_n.$$

The associated potential quantization steps are then calculated:

$$\Delta_{jk}^* = r^{-1}\left(\alpha_{jk}, \beta_{jk}, \frac{R_{jk}^*}{n_{jk}}\right)$$

then the new associated distortions:

$$D_{jk}^* = n_{jk} d(\alpha_{jk}, \beta_{jk}, \Delta_{jk}^*)$$

For each subband j,k it can be estimated what the reduction in distortion would be if the rate fragment F were to be allocated to it. This reduction would be:

$$D_{jk} - D_{jk}^*$$

The "best" subband j,k, that is the one for which the reduction in distortion is strongest, is allocated the fragment:

$$R_{jk} \leftarrow R_{jk}^*$$
$$D_{jk} \leftarrow D_{jk}^*$$
$$\Delta_{jk} \leftarrow \Delta_{jk}^*$$

The same rate allocation is reiterated for the next fragments $F_{n+1}$, $F_{n+2}$, until the rate to be allocated is exhausted.

Table 2 below indicates, for the abovementioned example, which are the values of α and β retained. The coding of the low-pass subband $W_{3,0}$ is performed in DPCM (Difference Pulse Code Modulation), and the statistics indicated in the table are therefore statistics of $W_{3,0}[n_k, m_k] - W_{3,0}[n_{k-1}, m_{k-1}]$, where the numbering of pairs $$k \mapsto (n_k, m_k)$$

indicates the direction chosen for the low-pass coefficients during the coding.

TABLE 2

Laplacian parameters for a test image

| j | k | $\alpha_{jk}$ | $\beta_{jk}$ | $D_{jk}$ | $R_{jk}$ |
|---|---|---|---|---|---|
| 1 | 1 | 0.50 | 1/2 | 50 | 444 |
| 1 | 2 | 0.35 | 1/2 | 35 | 444 |
| 1 | 3 | 0.56 | $1\sqrt{2}$ | 56 | 0 |
| 2 | 1 | 1.50 | 1/2 | 150 | 111 |
| 2 | 2 | 1.20 | 1/2 | 120 | 111 |
| 2 | 3 | 0.75 | 1/2 | 75 | 111 |
| 3 | 1 | 3.60 | 1/2 | 360 | 27.8 |
| 3 | 2 | 3.40 | 1/2 | 340 | 27.8 |
| 3 | 3 | 2.10 | 1/2 | 210 | 27.8 |
| 3 | 0 | 11 | 1/2 | 1100 | 27.8 |

The total rate allocated is therefore at least the sum of the rates $R_{jk}$ above, that is 1332 bits, therefore 0.005 bits per pixel. The setting is of 1 bit per pixel, that is a total budget of R=262144 bits, the image being of size 512×512.

The remaining rate to be allocated of 260812 bits is divided into parts that are not necessarily equal, but of sizes that are all less than a fixed limit. The first rate fragment to be allocated is for example of 384 bits.

The tables are used to calculate, for each subband, what the distortion associated with each subband will be if a budget of 384 additional bits were to be attributed to it. The result of these calculations is set out in table 3.

For example, for the subband $W_{1,2}$, the total rate $R_{1,2}$ would change from 444 bits to 828 bits, and the distortion $D_{1,2}$ would change from $0.93 \times 10^6$ to $0.89 \times 10^6$ and would therefore be reduced by $0.03 \times 10^6$.

TABLE 3

Simulations for allocating the first fragment. The distortions are to be multiplied by $10^6$.

| j | k | $R_{jk}$ | $\Delta_{jk}$ | $D_{jk}$ | $R^*_{jk}$ | $\Delta^*_{jk}$ | $D^*_{jk}$ | $D_{jk} - D^*_{jk}$ |
|---|---|---|---|---|---|---|---|---|
| 1 | 1 | 444 | 50 | 1.86 | 828 | 43 | 1.79 | 0.07 |
| 1 | 2 | 444 | 35 | 0.93 | 828 | 30 | 0.89 | 0.04 |
| 1 | 3 | 0 | 35 | 0.19 | 384 | 12 | 0.18 | 0.01 |
| 2 | 1 | 111 | 150 | 4.01 | 495 | 98 | 3.56 | 0.45 |
| 2 | 2 | 111 | 120 | 2.71 | 495 | 80 | 2.40 | 0.31 |
| 2 | 3 | 111 | 75 | 1.03 | 495 | 49 | 0.91 | 0.12 |
| 3 | 1 | 27.8 | 360 | 5.85 | 411 | 154 | 4.11 | 1.74 |
| 3 | 2 | 27.8 | 340 | 5.38 | 411 | 148 | 3.78 | 1.60 |
| 3 | 3 | 27.8 | 210 | 1.96 | 411 | 89 | 1.37 | 0.59 |
| 3 | 0 | 27.8 | 1100 | 5.24 | 411 | 461 | 3.68 | 1.56 |

In table 3, it is seen that the strongest reduction is obtained by allocating the 384 bits to the subband $W_{3,1}$. Therefor $\Delta_{3,1}$, $R_{3,1}$ and $D_{3,1}$ are updated and the process is continued by the allocation of the next fragment. When all the fragments have been allocated, quantization setting $\Delta_{jk}$, and prediction on the associated rate $R_{jk}$ and distortion $D_j$ for each subband, are therefore obtained.

The table finally obtained for the image is given in table 4 below:

TABLE 4

Example of settings of quantization and associated rates by the scheduler. The rates are given in bits per coefficient.

| j | k | $\Delta_{jk}$ | $R_{jk}$ |
|---|---|---|---|
| 1 | 1 | 6.1 | 0.92 |
| 1 | 2 | 6.5 | 0.53 |
| 1 | 3 | 8.4 | 0.03 |
| 2 | 1 | 5.7 | 2.5 |
| 2 | 2 | 5.7 | 2.1 |
| 2 | 3 | 5.8 | 1.4 |
| 3 | 0 | 6.3 | 3.8 |
| 3 | 1 | 5.8 | 3.7 |
| 3 | 2 | 6 | 2.9 |
| 3 | 3 | 5.9 | 5.5 |

Figure 4:
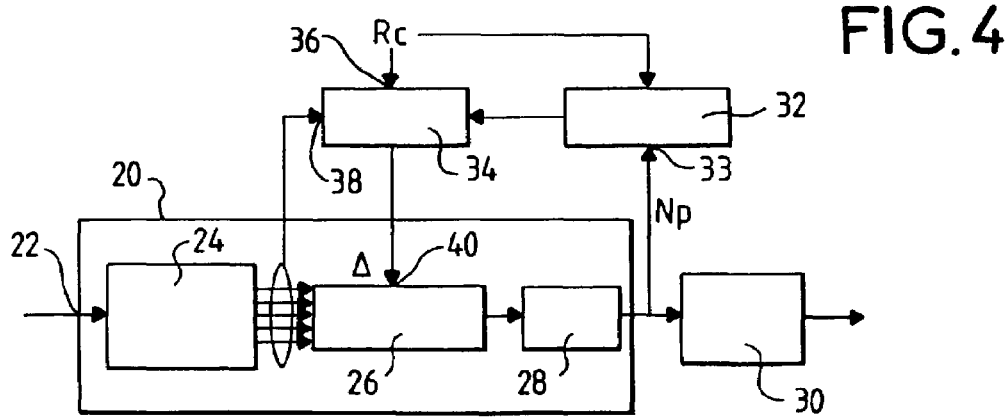
FIG. 4 is a schematic diagram of a device implementing the method according to the invention to which a control means has been added, which is intended to manage the filling of a buffer memory the role of which is to deliver a constant number of bits to a transmission channel or to any other device requiring a fixed rate.

The allocation of bits can be performed in open-loop mode or, preferably, in closed-loop mode with a device of the type illustrated in FIG. 4.

The rate regulation obtained using the device illustrated in FIG. 4 is to the nearest bit. This device is based on the one described in the French patent filed on Mar. 18, 1999 under the number 99/03371.

In this patent, a technique is described for the acquisition of images of the Earth by a moving observation satellite ("Push Broom" mode) in which the images are compressed and transmitted to the ground via a transmission channel which imposes a constant rate. To achieve this objective, an optimum allocation of bits is performed, in real time or in slightly deferred time, in order to code the subband coefficients, and then the allocation errors and variations in rate at the output of the entropy coder are corrected.

This device includes a compression means 20, and the image data is applied to the input 22 of said compression means 20. The compression means 20 includes a wavelet transformation unit 24 supplying data to a subband quantizer which delivers data to a coder 28 the output of which forms the output of the compression means 20. This output of the compression means 20 is linked to a regulation buffer memory 30 supplying, at its output, compressed data according to a rate $R_c$.

The coder 28 also supplies a number $N_p$ of bits produced which is applied to an input 33 of a control unit 32 having another input for the set rate $R_c$ and an output applied to a first input of a bit allocation unit 34. This latter unit 34 has another input 36 to which the set rate $R_c$ is applied and an input 38 to which the output data from the transformation unit 24 is applied.

The output of the unit 34 is applied to an input 40 of the subband quantizer 26.

The method and device in accordance with the invention enable the cost of coding the image to be reduced and ensure a rapid rate regulation since, unlike in the prior art, no iterative optimization (Lagrangian for example) is performed. The calculations are simple. Thus, the method in accordance with the invention is well suited for all the applications and, in particular, for space applications in which the resources are necessarily limited.

It is to be noted that, in the present description, the term "image" must be understood as being in the sense of an image of at least one dimension, that is to say that the invention extends to data in general.

The invention claimed is:

1. A computer implemented method for compressing data by transform, in which method the data is projected onto a base of localized orthogonal or biorthogonal functions, and each of the localized functions is quantize to enable an overall set rate $R_c$ to be satisfied, the method comprising:

associating a respective probability density model of coefficients in the form of a generalized Gaussian with each of a plurality of subbands, estimating parameter $\beta$ of the density model, while minimizing a relative entropy, or Kullback-Leibler distance, between the model and an empirical distribution of coefficients of each of the plurality of subbands, estimating parameter $\alpha$ based on the estimating parameter $\beta$, and determining and allocating a respective rate to each of the plurality of subbands such that a total distortion is minimal.

2. The computer implemented method claimed in claim 1, wherein said localized orthogonal or biorthogonal functions are wavelets.

3. The computer implemented method claimed in claim 2, wherein, to determine said respective parameter $\beta$ of the generalized Gaussian corresponding to a subband of index j,k, the following expression is minimized:

$$H(p_1 \| G_{\alpha(\beta),\beta}) = \frac{1}{\beta} + \frac{1}{\beta}\log(\beta W_{jk}^\beta) + \log\left(\frac{2\Gamma(1/\beta)}{\beta}\right)$$

in which formula the first term represents said relative entropy, $$W_{jk}^\beta$$

has the value:

$$W_{jk}^\beta = \frac{1}{n_{jk}}\sum_{n,m}|W_{jk}[n,m]|^\beta$$

$W_{jk}[n,m]$ being a coefficient of the subband of index j,k, and $n_{jk}$ being the number of coefficients in the subband of index j,k.

4. The computer implemented method claimed in claim 3, wherein said parameter $\alpha$ of the generalized Gaussian corresponding to the subband of index j,k is determined by the following formula:

$$\alpha = \sqrt[\beta]{\beta W_{jk}^\beta}.$$

5. The computer implemented method claimed in claim 1, wherein, for each of the plurality of subbands, graphs of rate R and distortion D are deduced, from the respective parameters $\alpha$ and $\beta$, as a function of the quantization and said graphs are tabulated to determine the respective rate.

6. The computer implemented method claimed in claim 5, wherein the tabulation of the distortion D is carried out for a sequence of values of the parameter $\beta$.

7. The computer implemented method claimed in claim 5, wherein the tabulation of the rate R is carried out for a sequence of values of the parameter $\beta$.

8. The computer implemented method claimed in claim 6, wherein the sequence of values of the parameters $\beta$ is $$\left\{\frac{1}{2}, \frac{1}{\sqrt{2}}, 1, \sqrt{2}, 2\right\}.$$

9. The computer implemented method claimed in claim 1, wherein a total bit budget is distributed to each of the plurality of subbands according to respective ability of each of the plurality of subbands to reduce the distortion of the compressed image.

10. The computer implemented method claimed in claim 9, wherein a bit budget corresponding to the highest tabulated quantization is assigned to each of the plurality of subbands and wherein remain of the bit budget is then cut into individual parts that are gradually allocated to the localized functions having the greatest ability to make the total distortion decrease, this operation being repeated until the bit budget is exhausted.

11. The computer implemented method claimed in claim 1, wherein the localized functions and the quantization for each of the plurality of subbands and the parameters $\alpha$ and $\beta$ of the density model are coded using a lossless entropy coder.

* * * * *